July 23, 1940.  G. L. ALWARD ET AL  2,208,693
APPARATUS FOR PERFORATING MATERIAL
Filed July 2, 1937   2 Sheets-Sheet 1
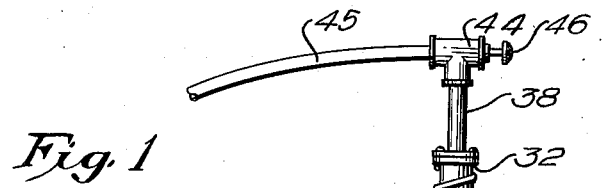
Fig. 1
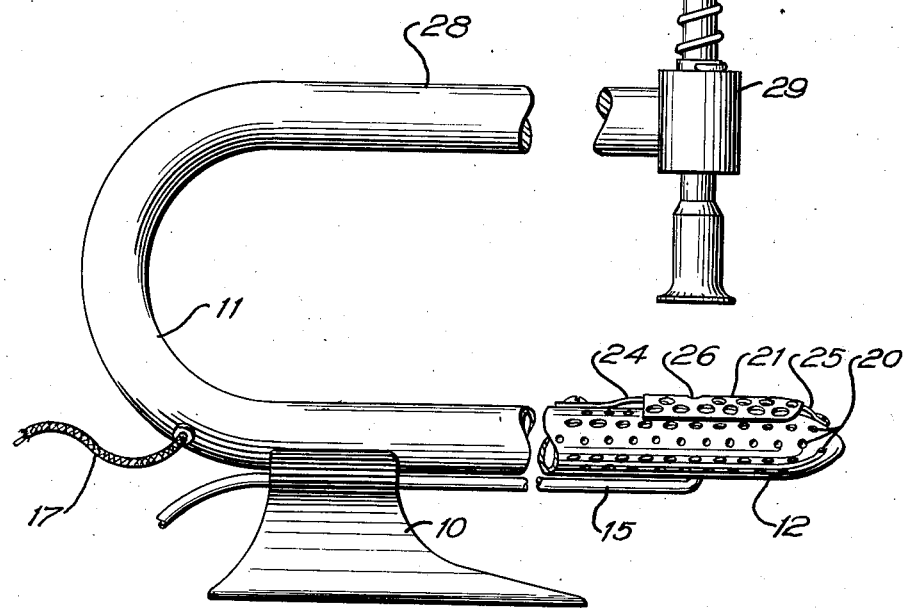
Fig. 2
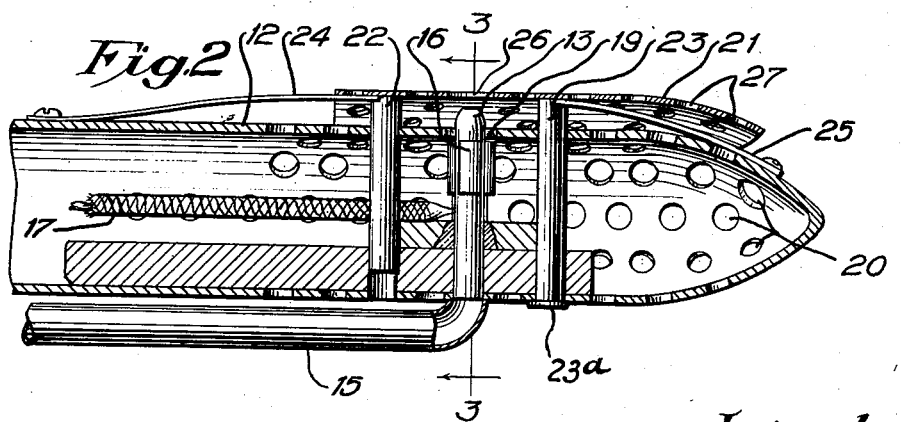
Inventor
Guy L. Alward
Charles T. Leap
By Willis T. Avay
Atty July 23, 1940.　　　G. L. ALWARD ET AL　　　2,208,693
APPARATUS FOR PERFORATING MATERIAL
Filed July 2, 1937　　　2 Sheets-Sheet 2
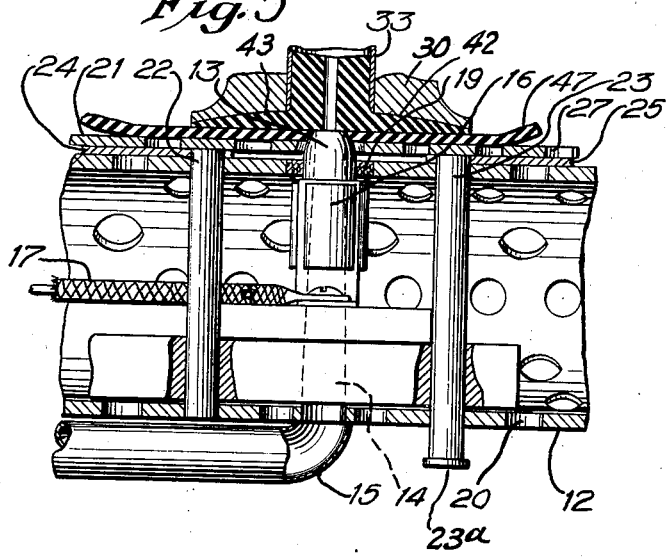
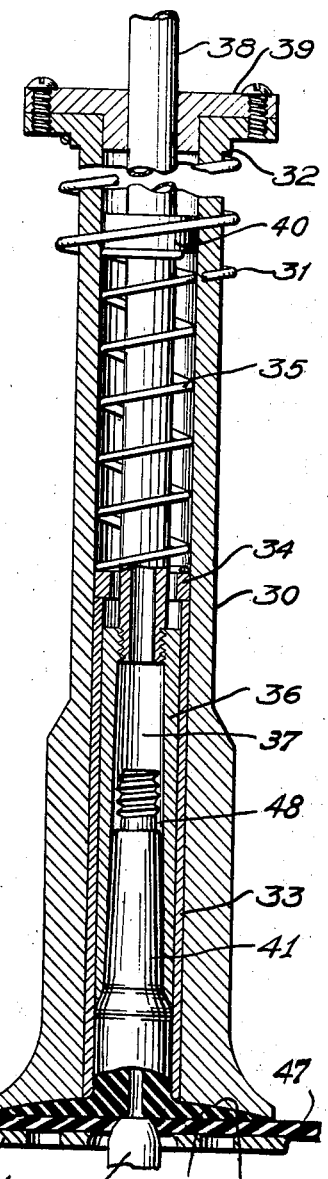
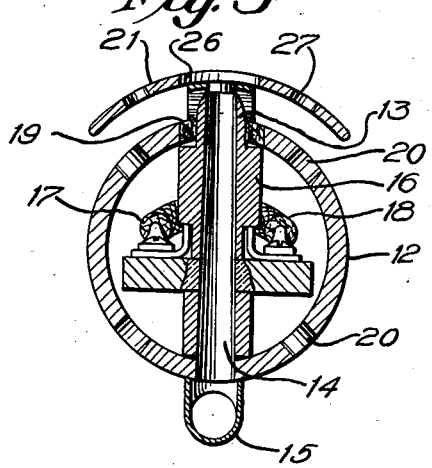
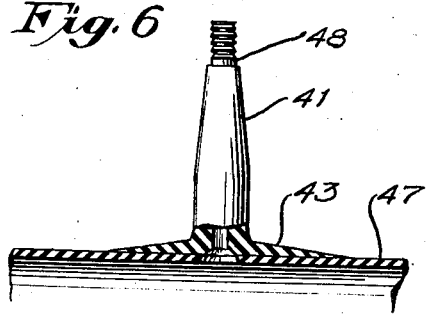
Inventor
Guy L. Alward
Charles F. Lear
By Willis F. Avey
Atty Patented July 23, 1940

2,208,693

UNITED STATES PATENT OFFICE 2,208,693

APPARATUS FOR PERFORATING MATERIAL

Guy L. Alward, Lynwood, and Charles Thomas Lear, Los Angeles, Calif., assignors to The B. F. Goodrich Company, New York, N. Y., a corporation of New York Application July 2, 1937, Serial No. 151,716

6 Claims. (Cl. 154—9)

This invention relates to apparatus for perforating sheet material, and is especially useful in perforating the wall of a rubber tube, such as a tire inner tube, in alignment with a valve stem or similar tubular projection attached to the face thereof. The device is also useful wherever a sheet of material is to be perforated in alignment with, or in relation to, a projection, tubular or otherwise, fixed to its surface.

It has been difficult heretofore to provide satisfactorily for a perforation in the wall of an inner tube for pneumatic tires or other soft rubber tube in satisfactory alignment with a rubber valve stem or other side branch previously coated or vulcanized in the tube. In providing such a perforation it is necessary not only that the perforation be accurately aligned with the valve stem bore so as not to restrict the flow therethrough, but also to remove waste material cleanly so that clogging of the valve stem in use by such waste material will not occur.

The principal objects of this invention are to provide accuracy of alignment, to provide clean cutting, to provide effectively for removal of waste material, to provide for convenience and economy of operation, and to provide simplicity of apparatus.

These and other objects will appear from the following description and the accompanying drawings.

Of the drawings:

Fig. 1 is a side elevation of apparatus constructed according to and embodying the invention in its preferred form, parts being broken away.

Fig. 2 is an enlarged sectional view of the work support and its associated parts, other parts being broken away.

Fig. 3 is a cross sectional view taken on line 3—3 of Fig. 2.

Fig. 4 is an axial sectional view on an enlarged scale of the valve-stem locating spindle, parts being broken away.

Fig. 5 is a detail sectional view of the support and the lower part of the valve-stem locating spindle with a rubber tube and its valve stem in place and the perforating operation completed.

Fig. 6 is a fragmentary detail view, partially in section, of the valve stem and a portion of the tube adjacent thereto after the punching operation has been completed.

Referring to the drawings, the numeral 10 designates the base of the apparatus which supports a U-shaped frame 11, the legs of which extend horizontally above the base and one above the other. The lower leg or horn 12 is of hollow construction and terminates in a rounded closed end. A perforating member, preferably a hollow punch 13, is mounted within the leg and extends vertically through an aperture in the top thereof with its cutting edge thereabove. A slug passageway 14 therethrough communicates with a slug conduit 15 which extends along the wall of the lower leg to carry the slugs away from the work.

An electric heating element 16 is preferably mounted on the punch within the horn for the purpose of heating the punch to facilitate its cutting action and is supplied by wires 17, 18 with current from a suitable source (not shown). In order to prevent overheating of the lower leg 12 of the frame, which acts as a horn anvil support for the material, a heat-insulating bushing 19 is mounted between the punch and the wall of the leg, and the leg is profusely perforated with apertures 20 to provide circulation of air therethrough and to increase its surface area in proportion to its mass.

To provide for supporting the tube above the punch and for stripping it therefrom after the punching operation, a stripper plate or material support 21 is fixed to a plurality of guide pins 22, 23 adapted to slide vertically in guide openings formed in the anvil. Springs 24, 25 hold it normally above the punch and spaced from the horn 25, an opening 26 being formed in the plate to clear the punch. A flange 23ª on one of the guide pins 23 limits upward movement of the plate 21. The plate is also perforated as at 27 to permit ventilation by increasing its radiation surface in proportion to its mass.

The upper leg 28 of the frame 11 is formed with a vertical guide 29, in alignment with the punch on the lower leg. Slidably supported in the guide 29 is a tubular spindle 30 adapted to be pressed against the tube to be cut and normally supported thereabove by a compression coil spring 31 which encompasses the spindle between the guide 29 and a shoulder 32 formed on the spindle. Removably fixed within the bore of the spindle is a sleeve 33 which provides a replaceable wear surface and a shoulder 34 to support a compression coil spring 35. Slidably mounted within the sleeve 33 is a valve-stem-engaging socket 36 formed with a tapered bore 37 and attached to an air supply pipe 38. The air supply pipe is slidably mounted in a cap 39 which closes the upper end of the spindle 30. A collar 40, fixed to the pipe 38 within the spindle, rests upon the coil spring 35 and normally holds the socket 36 well within the spindle. The arrangement is such that pressure applied downwardly to pipe 38 will be resisted by spring 35, one end of which receives pressure from the collar 40 attached to pipe 38, and the other end of which transmits the pressure to the shoulder 34 fixed to spindle 30. Any pressure transmitted to the spindle 30 through shoulder 34 in a downward direction will be resisted by coil spring 31 which supports spindle 30 from guide 29. The two springs 35 and 31 therefore resist downward movement of pipe 38 in series and will both be compressed simultaneously. Their relative compression, and corresponding relative movement of spindle 30 and socket 36 will depend upon their relative strength and dimensions. As soon as contact of the flange 42 with the valve base is made further pressure applied to the pipe 38 in a downward direction will cause the socket 36 to engage and seal against the tapered stem of the valve by axial movement of socket 36 relative to spindle 30. When normal pressure is applied in a downward direction to the pipe 38, the spindle 30 will be lowered into contact with the inner tube supported by the horn, compressing the coil spring 31. At the same time, the socket 36 will be moved downwardly with respect to the spindle 30, by compression of the coil spring 35, so as to engage over the valve stem, which is formed with a correspondingly tapered portion 41, to center the stem and to seal it to the air pipe, the arrangement being such that valve stems of different lengths can be centered automatically by the same device. The foot of the spindle 30 is flared and formed with a concave face 42 to fit against the base 43 of the valve stem and to distribute the pressure thereon over a large area.

A throttle valve 44 is fixed to the upper end of the pipe 38 and connects it to a source of air supply through a flexible hose 45. The valve may be opened by depressing a button 46.

In the operation of the device, an end of a tube 47, having a valve stem 48 vulcanized or cemented thereto, is slipped over the horn and over the stripper plate 21. The spindle 30 is pressed downwardly over the valve stem and forces the tube against the heated tubular punch 13 which cuts its way through the tube. The cutter is preferably heated to such a degree as to penetrate the rubber without burning the same, its action partaking of the nature of both cutting and softening to the extent of breaking down the rubber without burning it. Air under pressure is then admitted to pipe 38 by depressing the button 46, and the slug of rubber cut from the tube wall in alignment with the valve stem is blown through the punch 13 and conduit 15. By heating the punch 13 penetration of the punch through the rubber is accomplished with less exertion of pressure, the cut is cleaner, and adhesion of the rubber to the punch is avoided, cutting under such conditions being made possible without the use of a rigid backing for the cutter to operate against.

The heating is substantially confined to the immediate neighborhood of the punch by the insulation, and cooling of the tube contacting parts other than the cutter is accomplished by the perforation of those parts.

The construction of the valve stem engaging spindle assures accommodation of valve stems of different lengths and conservation of air pressure.

The invention is not entirely limited to the particular embodiment thereof herein illustrated, and variations are possible within the scope of the invention as it is defined in the following claims.

We claim:

1. Apparatus for perforating a layer of material with relation to a tubular projection on a face thereof, said apparatus comprising a hollow punch, a support for the material, and means for effecting the positioning of the material with respect to the punch by location from the projection thereon, said means being movable toward and from the support for pressing the material against said punch, and fluid operated means attached to said movable means for discharging fluid through said tubular projection to clear the opening.

2. Apparatus for perforating a layer of material with relation to a projection on a face thereof, said apparatus comprising a perforating member, a support for the material, and a socket in alignment with the perforating member adapted to engage the projection on the material for effecting the positioning of the material with respect to the perforating member by location from the projection thereon, said socket having means for automatically adjusting it to fit projections of different dimensions.

3. Apparatus for perforating a layer of material in alignment with a tubular projection extending from a side thereof, said apparatus comprising a perforating member, a support for the material, and means for effecting alignment of the tubular projection with said perforating member, said means comprising a socket member in alignment with the perforating member and having means to engage the projection in sealing engagement therewith, and a fluid-pressure connection thereon for ejecting material from the perforation, said socket member being movable toward said perforating member for pressing the material thereagainst.

4. Apparatus for perforating a rubber tube in alignment with a hollow rubber valve stem thereon, said apparatus comprising a perforating member, a horn surrounding the same and adapted to enter the tube and support the wall thereof, a socket member in alignment with said perforating member movable toward the perforating member and adapted to locate and support the valve stem in alignment with said perforating member, said socket being automatically adjustable to accommodate valve stems of different lengths, means for heating the perforating member, and means for ventilating the horn to cool the same.

5. Apparatus for perforating a layer of rubber material in alignment with a hollow tubular projection secured to a face thereof and having a tapered outer wall, said apparatus comprising a perforating member, a support for the rubber material thereabout, and movable means opposed to said perforating member for effecting the positioning of the material with respect to the perforating member by location from the tubular projection thereon, said movable means comprising a socket having a tapered bore in alignment with the perforating member and adapted to engage and support the tapered wall of the projection directly in line with the perforating member substantially to prevent distortion of the rubber during the perforating operation.

6. Apparatus for perforating a layer of rubber material in alignment with a hollow tubular projection secured to a face thereof and having a tapered outer wall, said apparatus comprising a perforating member, a support for the rubber material thereabout, and movable means opposed to said perforating member for effecting the positioning of the material with respect to the perforating member by location from the tubular projection thereon, said movable means comprising a socket having a tapered bore in alignment with the perforating member and adapted to engage and support the tapered wall of the projection directly in line with the perforating member substantially to prevent distortion of the rubber during the perforating operation, and a spring pressed sleeve concentric with said socket and slidably engaging the same for clamping a flange of the tubular projection against the layer of rubber material during the perforating operation.

GUY L. ALWARD.
CHARLES T. LEAR.